I. C. WOODWARD.
NUT LOCK.
APPLICATION FILED APR. 18, 1917.
1,273,439.  Patented July 23, 1918.
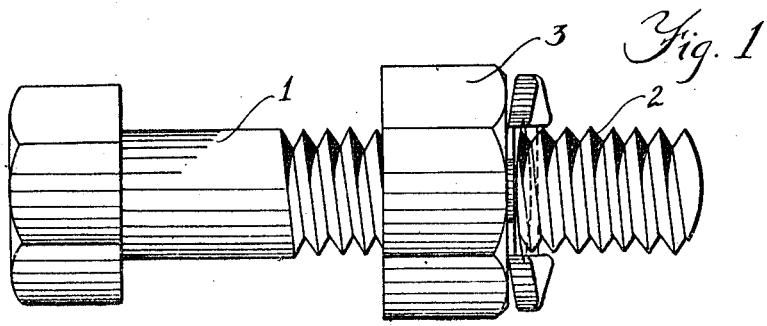
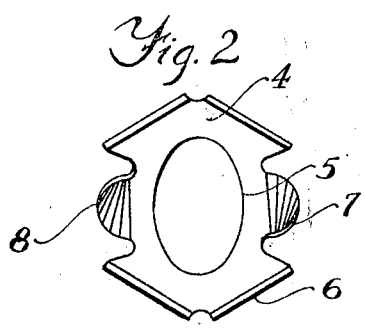 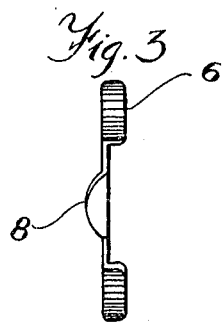
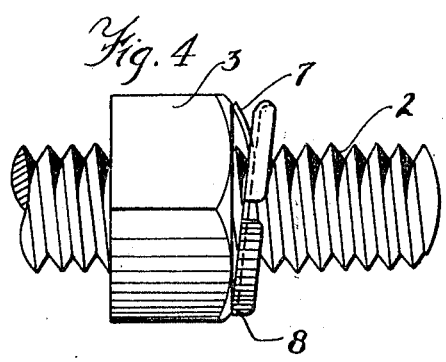 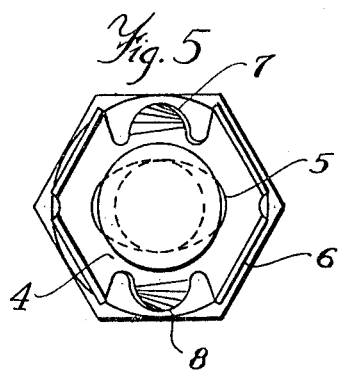
Witnesses
Wm. E. Anderson,
George C. Schultz
Inventor
Irving C. Woodward,
By Rummler & Rummler,
Atty's.

UNITED STATES PATENT OFFICE.

IRVING C. WOODWARD, OF CHICAGO, ILLINOIS, ASSIGNOR TO CENTRAL WEST MANUFACTURING CO., OF CHICAGO, ILLINOIS, A CORPORATION OF ILLINOIS.

NUT-LOCK.

1,273,439.   Specification of Letters Patent.   Patented July 23, 1918.

Application filed April 18, 1917.   Serial No. 162,936.

*To all whom it may concern:*

Be it known that I, IRVING C. WOODWARD, a citizen of the United States of America, and a resident of Chicago, county of Cook, and State of Illinois, have invented certain new and useful Improvements in Nut-Locks, of which the following is a specification.

The objects of this invention are to provide a nut-lock which may be formed from sheet metal by a single operation, does not require to be threaded, and is effective in performing the work intended in locking the holding nut on a bolt; and to provide a nut-lock which does not require any special attention in setting it on a bolt more than screwing it on by means of a wrench.

An illustrative embodiment of this invention is shown in the accompanying drawings, in which—

Figure 1 is a side elevation of a bolt having thereon a holding nut and the improved nut-lock.

Fig. 2 is a plan view of the nut-lock.

Fig. 3 is an end view of the nut-lock.

Fig. 4 is a fragmentary view of the bolt, holding nut and nut-lock as shown in Fig. 1.

Fig. 5 is an end view from the right-hand side of Fig. 4.

A number of sheet metal nut locks have been devised which require more or less difficult forming operations, including the shaping of a portion of the nut-lock in the form of a thread so that it may easily engage the thread of a bolt, but the present device is provided with a central aperture in such form that it will engage the thread of a bolt when applied thereon to incline according to the inclination of the thread on the bolt, except at one side where it crosses and clears the thread. The device is provided with a pair of oppositely disposed resilient lugs, at least one of which engages the surface of the nut to be locked on a bolt and serves to create pressure between the holding nut and the threads of the bolt, preventing displacement of the holding nut thereon.

In the drawings, a headed bolt 1 is shown with the usual threaded portion 2 on which is threaded a hexagonal holding nut 3. The nut-lock 4 is preferably formed from sheet metal, so as to have an elliptical or elongated central aperture 5, upstanding lugs 6, and downwardly inclined and preferably twisted lugs 7 and 8, in spaced angular relationship with the elongated sides of the aperture. The lugs are twisted so that they will bear on the holding nut and yet not have a tendency to dig into the latter while being turned down to holding position on the bolt.

After the single forming operation of punching out the nut and bending the lugs 4, 7, and 8, it is preferable to cause the nuts to go through a tumbling operation, and also after the usual heat treatment for the purpose of hardening and making resilient, the nut-locks are coated with zinc and lead to give them suitable finish and prevent oxidation.

The aperture 5 in the nut-lock is of the form shown, so that its short diameter exceeds the root diameter of the particular size of the bolt for which the nut-lock is intended, but is less than the full diameter of the bolt, while its long diameter is at least equal to one-half of the root diameter of the bolt, plus one-half of the whole diameter, in order to clear and cross the thread of the bolt at one side, while the remainder of the edge of the aperture 5 lies in the interdental of the thread. It is also possible with the form of aperture shown, which is elongated at each end, to so apply the nut-lock to the bolt that either the lug 8 or the lug 7 is nearest the surface of the holding nut 3. Accordingly, it is not necessary for a user of the device to give any particular attention to the manner in which the nut-lock is applied to the threaded bolt.

The periphery of the nut-lock is of hexagonal outline, so that it may be engaged by the usual wrench at a number of different angles. The nut-lock may be easily screwed down so that one of the lugs 7 or 8 contact with the nut 3, but when it is jammed against the nut by means of a wrench, one of the resilient lugs is bent upwardly to approximately the plane of the body portion of the nut-lock, as indicated at 8, Fig. 4, while the opposite lug 7 may lightly contact with the holding nut 3.

Although but one specific embodiment of this invention has been herein shown and described, it will be understood that numerous details of the construction shown may be altered or omitted without departing from the spirit of this invention as defined by the following claims.

I claim:

1. A nut-lock, comprising a piece of sheet metal having its outer edge suitably formed to be engaged by a wrench, an elongated aperture in the central portion of the nut-lock, and a pair of oppositely twisted lugs on opposite sides of the nut-lock and in line with the short diameter of said aperture.

2. A nut-lock, comprising a piece of sheet metal having at its outer edge upturned portions suitably formed to be engaged by a wrench, and a pair of downwardly inclined and twisted lugs on opposite sides of the nut-lock for bearing against the surface of a nut, said nut-lock having a central elongated aperture suitable for coacting with the threaded portion of a bolt.

3. A nut-lock, comprising a piece of sheet metal having its edges adapted for engaging a wrench and having an aperture adapted for coactive engagement with the thread grooves of a bolt and elongated at one side to straddle the thread, and a resilient inclined lug located in spaced angular relation to the elongated side of said aperture.

Signed at Chicago this 16th day of April, 1917.

IRVING C. WOODWARD.